United States Patent [19]

Keuschnigg et al.

[11] Patent Number: 4,605,119

[45] Date of Patent: * Aug. 12, 1986

[54] DRIVE ARRANGEMENT FOR THE LOADING ARMS OF A LOADING RAMP FOR HEADING MACHINES OR LONGWALL SHEARING MACHINES

[75] Inventors: Josef Keuschnigg, Ehrenhausen; Arnulf Kissich, Zeltweg, both of Austria

[73] Assignee: Voest-Alpine Aktiengesellschaft, Vienna, Austria

[*] Notice: The portion of the term of this patent subsequent to Nov. 12, 2002 has been disclaimed.

[21] Appl. No.: 563,984

[22] Filed: Dec. 21, 1983

[30] Foreign Application Priority Data

Dec. 23, 1982 [AT] Austria ................................ 4672/82

[51] Int. Cl.⁴ ............................................. B65G 65/02
[52] U.S. Cl. ...................................... 198/514; 299/67
[58] Field of Search ................. 198/514, 516; 299/12, 299/18, 45, 64, 67

[56] References Cited

U.S. PATENT DOCUMENTS 2,885,056  5/1959  McElhattan ........................ 198/514
3,680,920  8/1972  Amoroso .......................... 198/514 X
4,047,762  9/1977  Bamford et al. ................ 198/514 X

FOREIGN PATENT DOCUMENTS 2123061  1/1984  United Kingdom ................ 198/514

Primary Examiner—Joseph E. Valenza
Assistant Examiner—Lyle Kim
Attorney, Agent, or Firm—Cushman, Darby & Cushman

[57] ABSTRACT

In a drive arrangement for the loading arms (5) of a loading ramp for a heading machine or longwall shearing machine, each loading arm (5) is rotatably supported in off-center position on a rotary disc (7) and extended beyond its axis of rotation (6) by guide arm (10) arranged so as to swivel around a bearing point on one end of a steering lever (11). The heading machine or longwall shearing machine has—for broadening its loading ramp—laterally outwardly swivellable parts (2) having arranged thereon, in a manner preventing angular movement, an arm (14) extending beyond the pivotal axis (4) of the extendible part (2). For automatic adaptation of the removal width of the loading arms (5) to the selected working width of the loading ramp, the other end of the steering lever (11) is hinged to the free end of the arm (14) connected with the outwardly swivellable part (2).

8 Claims, 1 Drawing Figure

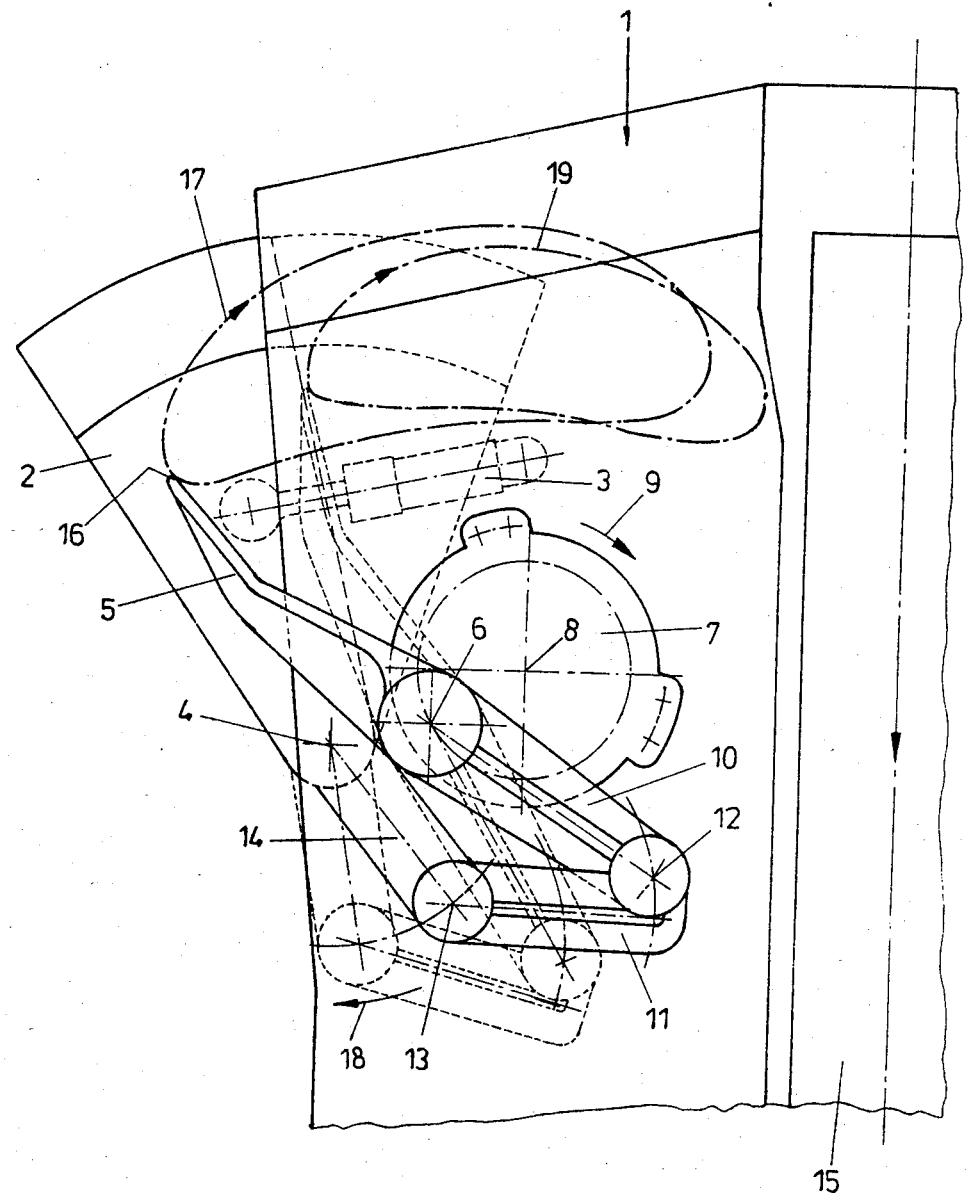

DRIVE ARRANGEMENT FOR THE LOADING ARMS OF A LOADING RAMP FOR HEADING MACHINES OR LONGWALL SHEARING MACHINES

The invention refers to a drive arrangement for the loading arms of a loading ramp for heading machines or longwall shearing machines comprising a laterally extendible part for increasing the surface of the loading ramp, said loading arms sweeping over the surface of the loading ramp and the free ends of the loading arms moving along closed paths adaptable to the width of the loading ramp.

For driving the loading arms of loading ramps, which are also called lobster claws, it is necessary to select the path of movement of the ends of the loading arms in the direction towards the machine center or transport device, respectively, different from the path of return into the starting position, so that with such a shifting movement the material to be removed is conveyed to the transport means. The ends of the loading arms or lobster claws, respectively, are thus moved along a closed curve, the path of movement in the direction towards the machine center being located nearer to the front end of the loading ramp than the path of return of the loading arms into their outermost lateral position. A drive means has, for example, been made known in U.S. Pat. Nos. 3,603,644 and in 3,810,677, and has each loading arm rotatably supported in off-center position on a rotary disc and extending beyond its rotational axis by means of a guide arm having linked thereto one end of a steering lever, the other end of which is pivotally supported on a stationary bearing point. With these known embodiments of drive arrangements, no improvement of the removal efficiency could be achieved in case the loading ramp is given a greater width according to various known proposals, for example by means of insertable side members of the loading ramp, because the loading arms no longer sweep over the enlarged area of the loading table. Any adaptation of the loading ramp to the width of the drift would thus only result in an unsatisfactory improvement of the removal efficiency.

A drive arrangement of the initially mentioned type is known from U.S. Pat. No. 4,047,762 and French Pat. No. 2 307 951, respectively. In these arrangements, enlargement members can, on the one hand, be swung out laterally, and the paths along which the free ends of the loading arms move are, on the other hand, adjustable. For this purpose, the angle of pivotal movement of the loading arms, being pivoted by means of pressurized fluid cylinders, can be adjusted, and the length of the loading arms is adjustable by hydraulic means, so that the free ends of the loading arms are moved along a quadrangle having arcuate sides. Extension and retracting of the enlargement members is in this case independent of any change in the loading arm kinematics, and vice versa.

The invention aims at providing a drive arrangement of the initially mentioned type in which the kinematics of the loading arms can be adapted to the particular width of the loading ramp for the purpose of ensuring removal of material almost to the edge of the loading table, even with a loading table having been given a greater width. For solving this task, the invention essentially consists in that each loading arm is, in a manner known per se, rotatably supported in off-center position on a rotary disc and is extended beyond its rotary axis by means of a guide arm arranged so as to be swivelled around a bearing point located on one end of a steering lever, and in that the other end of the steering lever is coupled with the extendible part of the loading ramp. Thus the bearing point of the guide arm is displaced by the pivotable steering lever and, depending on the position of the bearing common to the extendible part of the loading ramp and the steering lever, the free ends of the loading arms describe different paths, whereby the operating area of the loading arms is changed so that automatic adaptation to the existing width of the loading ramp is effected.

In a particularly advantageous manner, the arrangement is such that the steering lever is pivotally linked to the extendible part of the loading ramp, so that it can be swivelled around an axis extending parallel to the pivotal axis of the loading ramp part extendible by swivelling movement, and to the guide arm to be swivelled around an axis extending parallel to the first-mentioned axis. In this manner, there results a simple, compact and operationally safe construction which can withstand even high mechanical stress.

In a simple manner, the steering lever can act on an arm connected with the extendible part of the loading ramp and extending beyond the pivotal axis of the extendible part of the loading ramp. Thus a short steering lever can be used, which then is arranged between the free ends of the guide arm and of the arm connected to the pivotable part of the loading ramp. A particularly favorable kinematics will result if the length of the arm connected with the extendible part of the loading ramp is shorter than or equal to the length of the guide arm of the loading arm.

The steering lever is preferably an L-shaped steering lever, and the guide arm acts on the shorter arm of the steering lever. On account of the L-shaped construction and on account of the area of action of the guide arm on the shorter arm of the steering lever, there results the advantage that the construction may be made compact without running the risk of a collision between the steering lever and the guide arm. In a limiting position, the L-shaped steering lever may extend almost parallel to the guide arm of the loading arms. As a continuation of this concept, the steering lever as well as the guide arm can be of L-shaped construction, the shorter arms of the steering lever and of the guide arm being associated with one another.

For preventing cut particles from becoming pinched between the steering lever and the guide arm, the arrangement is preferably such that the steering lever and optionally also the guide arm are, as seen in a cross-section, triangular in shape or else shaped like a roof. The less inclined edges of this roof shape or triangular cross-section can in this case be arranged to face one another. In this manner, material, if any, having fallen down between the steering lever and the guide arm is lifted above the inclined surfaces of the guide arm and steering lever, so that the danger of jamming is reduced.

Conveniently, the length of the arm connected with the extendible part of the loading ramp is smaller than or equal to the length of the guide arm of the loading arm. This warrants an unobjectionable functioning of the loading arms without the danger of self-locking, even with a relatively great pivotal range of the extendible part of the loading ramp.

In addition to the removal width of the loading arms being automatically adapted to the existing working width of the loading ramp, provision can be made, for example for the purpose of adaptation to different materials to be removed, for a possible arbitrary change of the kinematics of the loading arms by making adjustable the effective length of the steering lever and/or the effective length of the arm connected with the extendible part of the loading ramp, connected thereto in such a manner as to prevent angular movement.

For swivelling the extendible part of the loading ramp, a hydraulic operating cylinder is used as a rule. According to a preferred further development of the invention, this hydraulic operating cylinder can be equipped with a pressure-control valve, which is in effective connection with the drive means of the loading arms. If the loading arm becomes jammed by the material to be removed, load peaks can, in this manner, be made ineffective, because the reaction force generated becomes effective on the pressure-control valve via the steering lever and the pivotable part of the loading ramp.

In the following paragraphs, the invention is explained further with reference to an embodiment shown in the drawing.

In the drawing, there is shown a portion 1 of a loading ramp, to which a laterally extendible part 2 is connected. The shifting movement of the extendible part 2 is effected by means of a hydraulic operating cylinder 3, which is linked to a rigid part 1 of the loading ramp and to the extendible part 2 of the loading ramp. The extendible and outwardly swivelable part 2 of the loading ramp is hinged to the rigid portion 1 of the loading ramp, so that it can be swivelled around a pivotal axis 4.

The loading arms 5 are linked to a rotary disc 7, so that they can be swivelled around a pivotal axis 6 forming a linking point, this linking point formed by the pivotal axis 6 being different from the pivotal axis 8 of the rotary disc 7. The sense of rotation of the rotary disc 7 is indicated by the arrow 9. A guide arm 10 is linked with the loading arms 5 in a manner preventing angular movement. A steering lever 11 acts on the free end of this guide arm 10, the axis of the pivotal point of the steering lever 11 on the free end of the guide arm 10 being designated by 12. The other end of the steering lever 11 is linked so as to swivel around an axis 13 on an arm 14 which is connected with the extendible part 2 of the loading ramp in a manner preventing angular movement.

In the representation of FIG. 1, the extendible part 2 of the loading ramp is shown in its extended position, and thus the arm 14 connected with this part in a manner preventing angular movement is swivelled inward, so that the axis 12 is located closer to the transport means 15 extending in the middle between the portions 1 of the loading ramp. In this position, the free ends 16 of the loading arms 5 describe the path designated by 17, so that removal of the material also takes place in the area of the enlargement of the loading table.

On inward swivelling of the swivellable part 2 of the loading ramp, the axis 13 of the steering lever 11 is moved outward in the direction of the arrow 18, and the position assumed in completely inwardly-swivelled position is shown in dashed lines. In this position shown in dashed lines, the axis 12 of the steering lever 11 on the guide arm 10 is also displaced further outward, and the ends of the loading arms 5 now describe the path 19, which now only extends over the rigid portion 1 of the loading ramp.

The guide arm 10 and the steering lever 11 have, as seen in a cross-section, a roof-like profile, so that the danger of cut material becoming clamped between the mutually facing edges of the guide arm 10 and the steering lever 11 is reduced.

A pressure-relief valve is connected with the hydraulic operating cylinder 3 and gives a response in case of blocking of the loading arms 5 and shuts off the drive of the loading arms.

The cranked construction of the steering lever 11 provides simultaneously the advantage that the loading ramp can be given a shorter length. In a construction in which the steering lever 11 is not cranked, the arm 14 of the pivotable part of the loading ramp would have to be given a substantially greater length for obtaining a sufficiently large angle between the steering lever 11 and the guide arm 10 in any position, which would result in a greater length of the loading ramp in the direction towards the machine.

What is claimed is:

1. Drive arrangement for the loading arms of a loading ramp for heading machines or longwall shearing machines including a loading ramp, a pivotally mounted laterally extendible member for increasing the surface area of said loading ramp, the drive arrangement comprising a rotary disc pivotally supporting said loading arm in an off-center position, a guide arm fixed to the loading arm and extending from the vicinity of the pivotal support on the rotary disc, a steering lever having one end pivotally connected to the guide arm, said steering arm further connected at its opposite end to said laterally extendible member, the drive arrangement being such that rotational movement of the rotary disc about a fixed axis produces an orbital path in the loading arm and pivotal movement of said laterally extendible member varies the location of said orbital path of the loading arms.

2. Arrangment as claimed in claim 1, characterized in that the steering lever is pivotally connected with the extendible member of the loading ramp and extending beyond the pivotal axis of the extendible member of the loading ramp.

3. Arrangment as claimed in claim 1, characterized in that the steering lever and the guide arm have a triangular cross-section shape.

4. Arrangment as claimed in claim 1, characterized in that the length of the arm connected with the extendible member of the loading ramp is smaller than or equal to the length of the guide arm of the loading arm.

5. Arrangment as claimed in claim 1, characterized in that the effective length of the steering lever is adjustable.

6. Arrangment as claimed in claim 2, characterized in that the effective length of the arm connected with the extendible part of the loading ramp in a manner to prevent angular movement is adjustable.

7. Arrangment as claimed in claim 2, characterized in that a hydraulic operating cylinder provided for swivelling the extendible member of the loading ramp is in effective connection with the drive means of the loading arms.

8. A drive arrangment for a gathering means of a mining machine, the gathering means being of the type including a pair of loading arms movable in an orbital path, the mining machine having a loading ramp and a pair of laterally extendible members for increasing the surface area of the loading ramp and being pivotally connected about a vertical axis on the mining machine, the laterally extendible members having a fixed arm extending from the vicinity of the pivotal connection, the drive arrangment comprising a rotary disc pivotally supporting a loading arm about an axis spaced from the center of said rotary disc, a guide arm fixed to the loading arm, a steering lever having one end pivotally connected to the guide arm with its opposite end pivotally connected to said fixed arm of the laterally extendible member, the drive arrangment being such that rotational movement of the rotary disc produces an orbital path in the loading arm and further that pivotal movement of said laterally extendible member varies the location of the orbital path of the loading arms.

* * * * *